Patented Sept. 20, 1938

2,130,501

UNITED STATES PATENT OFFICE 2,130,501

REDUCTION OF CYCLIC ETHERS

Wilbur Arthur Lazier, Marshallton, Del., assignor to E. I. du Pont de Nemours & Company, Wilmington, Del., a corporation of Delaware No Drawing. Application June 27, 1934, Serial No. 732,657

14 Claims. (Cl. 260—345)

This invention relates to catalytic hydrogenation processes, and more particularly to processes for the formation of oxygenated organic products by the catalytic reduction of certain carboxylic compounds of special structure. Specifically, the invention relates to processes for the synthesis of cyclic ethers. This application is a continuation in part of application Serial No. 629,754, filed August 20, 1932.

In U. S. Patent 1,839,974 and my copending application Serial No. 445,224, filed April 17, 1930, and the above mentioned application Serial No. 629,754, there have been disclosed novel methods for the catalytic hydrogenation of carboxylic compounds to the corresponding hydroxy compounds. In the course of extending further the general investigation of catalytic reductions of organic compounds containing carboxyl and carbonyl groups, it has now been found that certain hydroxy and ketonic acids and their esters, when subjected to catalytic hydrogenation in a manner similar to that previously disclosed, are converted at least in part into the corresponding cyclic ethers. To be sure, it is already known from the work of Sabatier and his co-workers, that certain gamma diketones are converted by hydrogenation to the corresponding cyclic ethers, but in so far as I am aware it was not known prior to my discovery thereof that hydroxy and ketonic acids and their derivatives could be successfully hydrogenated without decomposition, or that the corresponding ethers would be sufficiently stable towards hydrogenation to survive the drastic conditions imposed in order to effect catalytic reduction of the carboxyl group.

This invention, therefore, has as an object the provision of a novel process for the formation of cyclic ethers and as a further object the formation of said ethers by the catalytic hydrogenation of certain carboxylic compounds of suitable structure. Other objects will appear hereinafter.

These objects are accomplished by the following invention, which in its general aspects comprises admixing a gamma or delta hydroxy, keto, or aldehydic carboxylic compound, or a 1,2 or 1,3-dicarboxylic compound with hydrogen and bringing the mixture into contact with a suitable hydrogenating catalyst at elevated temperatures and pressures. In this manner there is formed a reduction product which contains as a major component a cyclic ether having four or five carbon atoms respectively in the ether ring.

In the following examples I have set forth several of the preferred embodiments of the invention, but they are presented for purposes of illustration and not in limitation.

*Example 1.*—Fifteen hundred grams of copper nitrate dissolved in 4 l. of water was mixed with a solution containing 1,000 g. of amonium chromate in an equal volume of water. Ammonium hydroxide was added to neutralize the acidity developed during precipitation of the copper ammonium chromate. The precipitate was washed by decantation, filtered, and dried, after which it was ignited at a temperature of 400° C. The ignition residue was then extracted twice with 10% acetic acid, washed and dried. The resulting copper chromite powder was employed for the hydrogenation of butyl levulinate without further treatment.

A steel autoclave capable of withstanding high pressure was charged with 100 g. of butyl levulinate, 10 g. of butyl alcohol, and 10 g. of copper chromite catalyst prepared as described above. A hydrogen pressure of 3,000 lbs per sq. in. and a temperature of 250° C. were maintained while the mixture was agitated for 2.5 hours. At the end of this period the saponification number of the product indicated an 80% conversion of the esters to alcohols and/or ethers. Separation of the products by distillation resulted in the isolation of 20 g. of methyl tetrahydrofurane boiling at 72–73° C., or the equivalent of a 40% yield based on the 100 g. charged. This reaction proceeds stepwise, the reduction of the levulinic ester to the corresponding hydroxy valeric ester taking place at a temperature substantially lower than that required for the reduction of the carboxyl group.

*Example 2.*—A barium-containing copper chromite catalyst was prepared as follows: To a solution consisting of 52 g. of barium nitrate and 436 g. of copper nitrate trihydrate dissolved in 1,600 cc. of water there was added with stirring a second solution consisting of 252 g. of ammonium bichromate and 300 cc. of 28% ammonium hydroxide dissolved in 1,200 cc. of water. The precipitate comprising the mixed chromate was filtered, dried, and ignited. After two extractions with dilute acetic acid followed by washing, drying, and powdering, the resulting barium copper chromite catalyst was used for hydrogenation without further treatment.

One hundred fifty grams of ethyl citrate and 12 g. of the copper barium chromite catalyst prepared as described were charged into a steel reaction tube built to withstand high pressure. The tube was agitated for 4.5 hrs. at a temperature of 240° C. and a hydrogenation pressure of 600 atm. From the reaction product there was isolated 25 g. of a trihydric alcohol (trimethylol propane) and an oily residue containing a substantial quantity of a cyclic ether alcohol, the constitution of which was not fully determined.

*Example 3.*—Three hundred grams of copper chromite catalyst prepared as described in Example 1 and 3,636 g. of butyl succinate were charged into a high pressure stirring autoclave. Hydrogen was introduced until a pressure of 3,000 lbs. per sq. in. was attained. The mixture was heated to 255° C. and vigorously agitated for 4 hrs. after which the absorption of hydrogen was observed to cease. The products of hydrogenation were fractionally distilled and yielded 378 g. of tetrahydrofurane boiling at 67–70° C. The residue was then refluxed with a solution containing 90 g. of sodium hydroxide. There was isolated by fractional distillation 527 g. of tetramethylene glycol boiling at 115–118° C./6 mm.

*Example 4.*—A hydrogenation catalyst was prepared as follows: 23 g. of cadmium nitrate, 24 g. of copper nitrate, and 245 g. of zinc nitrate were dissolved in 500 cc. of water and mixed at ordinary temperature with an equal volume of water containing 126 g. of ammonium bichromate and 75 cc. of 28% ammonium hydroxide. After stirring, the mixture was exactly neutralized with additional ammonium hydroxide and allowed to settle. After several washes by decantation, the precipitate was dried, ignited at 400° C., and compressed into tablets suitable for use in catalytic gas apparatus.

Twenty-five cc. of the mixed chromite catalyst prepared as described above was loaded into an alloy steel reaction vessel capable of being heated and withstanding high pressure. The tube was fitted with a preheater, a pump for injecting liquid ester at a constant rate, a T connection for introducing hydrogen under pressure, a suitable condenser and trap for separating liquid products, and suitable exit control valves. The diethyl ester of succinic acid was vaporized and passed over the catalyst, together with hydrogen at the rate of 8 volumes of the liquid ester per unit volume of catalyst per hour at a temperature of 367° C. and a pressure of 2,500 lbs. per sq. in. The hydrogen-ester molecular ratio was about 10. Analysis of the condensed product showed that the ester had been hydrogenated to the extent of about 75%, the principal products being tetramethylene glycol and tetrahydrofurane.

*Example 5.*—Twenty-five cubic centimeters of a composite hydrogenation catalyst prepared as described in Example 4 was placed in a high pressure reaction tube. The diethyl ester of hexahydrophthalic acid was pumped over it together with an amount of hydrogen equivalent to 20 times that theoretically necessary for complete reduction of the ester. The temperature was maintained at 385° C. and the hydrogen pressure at 2,900 lbs. per sq. in. The diethyl hexahydrophthalate was vaporized in a preheater and forced through the reaction tube at the rate of 100 g. per hr. After leaving the reaction tube, the vapor mixture was condensed by cooling and the liquid products formed by hydrogenation were separated from the stream of hydrogen in a suitable trap. A 4-hr. accumulation of the condensate thus obtained weighed approximately 400 g. and gave upon fractional distillation 32 g. of hexahydrophthalyl ether, 136 g. of 2-methyl cyclohexyl carbinol, and 7 g. of hexahydrophthalyl alcohol.

Instead of using the ester of hexahydrophthalic acid, one may employ with equal success hexahydrophthalic acid, hexahydrophthalic anhydride, or hexahydrophthalide, since the nature of the product is not greatly influenced by the particular derivative of the acid hydrogenated, but rather by the number of carbon atoms separating the oxygenated groups.

Although certain definite conditions of operation such as temperature, pressure, and time of contact of the material to be hydrogenated with the catalyst have been indicated in the above examples, it will be apparent that these factors may be varied within fairly wide limits within the scope of the invention. The catalytic reduction of the compounds comprehended in this invention requires the use of temperatures and pressures appreciably higher than customarily employed for non-carboxylic compounds. For example, the temperature may range from above 200° up to 500° C. The preferred temperature range, however, is 240–400° C., depending somewhat on the catalyst composition selected and the method used for carrying out the given reaction. The success of the process also depends in a large measure on the use of an elevated pressure in excess of 10 atm., preferably in the range of 30–650 atm. The maximum pressure that can be used is limited, of course, only by the capacity of the reaction apparatus for withstanding the high pressures. It is to be understood that the invention is not limited to the use of any specific pressures, since these may be varied depending upon the hydroxy or ketonic carboxylic compound treated and the extent of conversion desired.

As illustrated in the various examples, the hydrogenation of hydroxy, ketonic, and aldehydic carboxylic compounds and dicarboxylic compounds may be carried out in a liquid phase static system, or in a vapor or liquid phase system suitably adapted to a continuous flow. In all cases a considerable excess of hydrogen over and above that theoretically required for complete reaction of the carboxylic compound is employed. In carrying out the hydrogenation processes of this invention in a continuous reaction system, the rate at which the compound to be hydrogenated should be pumped over the catalyst to give optimum results is a function of the activity of the catalyst, the temperature, and also the molecular weight of the compound hydrogenated. An active hydrogenating catalyst will ordinarily convert 8 liquid volumes of the compound hydrogenated per volume of catalyst per hour. Higher or lower rates of flow may be employed with the result of somewhat different degrees of conversion. For example, I may employ space velocities in the range from 2 to 20 liquid volumes per volume of catalyst per hour. In the continuous method the ratio of hydrogen to the compound to be hydrogenated may also be varied over a wide range but always in the direction of an excess of hydrogen; for example, about 5–10 moles of hydrogen per mole of compound hydrogenated is preferable in order to obtain satisfactory conversion.

Whereas the critical factors in the formation of cyclic ethers are the use of high temperatures and high pressures, the selection of the catalyst is less exacting, and suitable catalysts include a large number of hydrogenating metals and hydrogenating metal oxides. Catalysts found suitable for the synthesis of methanol from water gas are, in general, also suitable for the hydrogenation of hydroxy and ketonic carboxylic compounds. For example, I may use reduced metals such as silver, copper, tin, cadmium and lead, and in certain cases iron, cobalt or nickel. Good results are obtained with fused copper oxide, either wholly or partially reduced. The copper catalyst may be promoted with oxide promoters such as manganese oxide, zinc oxide, magnesium oxide or chromium oxide. These promoted catalysts may be physical mixtures or chemical compounds containing copper, that is, copper chromate or chromite. A metallic catalyst in the form of a powder may also be used, in which case it is advisable to employ a suitable supporting material such as silica, activated carbon, alumina, or a naturally occurring earth such as kieselguhr. It has been found that elementary nickel supported on kieselguhr and prepared by reduction of the hydroxide or carbonate may be used for the hydrogenation of certain esters leading to the formation of cyclic ethers. Such a catalyst, however, has the disadvantage that it has a tendency to give side reactions by which hydrocarbons are formed rather than the more desirable cyclic ethers. Certain metallic oxides belonging to the class known as difficultly reducible oxides and having hydrogenating and dehydrating propensities may be employed. By the term "difficultly reducible" is meant that the oxides are not substantially reduced to metal by prolonged exposure in a state of purity to the action of hydrogen at atmospheric pressure and at a temperature of 400–450° C. Such oxides suitable for the hydrogenation of hydroxy, ketonic, and aldehydic carboxylic compounds are zinc oxide, manganese oxide, magnesium oxide, etc. These oxides may be employed either alone or in combination with each other, or with other oxides which have a promoting or dehydrating action. Preferably the oxide employed as a promoter for the hydrogenating oxide has little activity of itself or is much less active than the hydrogenating oxide employed with it, but it yet serves to further promote the activity of the more active oxide towards the formation of cyclic ethers. It has been found advantageous to employ chromium oxide as a promoter in physical admixture or in chemical combination, e. g., as a chromate or chromite with a large number of oxides ordinarily regarded as easily reducible. The acidic promoting oxides other than chromium oxide may also be used, either in physical admixture or in chemical combination, e. g., as tungstates, vanadates, molybdates, etc. The reducible oxides, when combined or otherwise associated with chromium oxide are only partially reduced under conditions of hydrogenation and found to be very effective catalysts for the processes of this invention. The oxides of cadmium, copper, tin and bismuth are all examples of oxides that may be employed in the more difficultly reducible condition.

In carrying out the processes of this invention, I may use any one of the catalysts previously disclosed in United States Patent 1,857,921. A preferred catalyst containing a single hydrogenating metal oxide may be prepared according to the general method described in United States Patents 1,746,782 and 1,746,783 and illustrated more fully in Example 1 above. This latter type of catalyst is prepared by ignition of a hydrogenating metal chromate or of a hydrogenating metal ammonium chromate, or it may be prepared by reduction by hydrogen of the said chromate at a temperature of 400 to 500° C. Particularly good results have been obtained in the preparation of catalysts to be used for the synthesis of cyclic ethers by preparing a catalyst according to the method of United States Patent 1,746,783, wherein a double ammonium chromate of the hydrogenating metal is heated to about 400° C. to form a chromite catalyst, the activity of which is further enhanced by extracting with acid. It is desirable to make special mention of the utility of catalysts containing copper oxides promoted by chromium oxide either in physical mixture or in chemical combination as copper chromite. This catalyst is particularly useful for the liquid phase hydrogenation of hydroxy and ketonic carboxylic acid compounds.

The advantages attending the use of copper chromite and the chromites of other hydrogenating metals are several and substantial. These catalysts possess high activity and are sturdy in character. They are relatively immune to degenerative processes such as sintering or poisoning, being thus distinguished from metal catalysts which deteriorate rapidly when subjected to excessive heating. Unlike certain metal catalysts, they possess but a small tendency to carry the hydrogenation beyond the alcohol and ether stage, as for example in the production of the corresponding hydrocarbon. The catalysts described above may be further promoted or modified by the addition of oxides or carbonates of alkali metals or of alkaline earth metals, or of basic compounds of alkali metals or of alkaline earth metals; that is, compounds of these alkali forming metals with acids which are weaker than the metal hydroxides. Other suitable promoters are compounds containing an alkali or alkaline earth metal combined with the acid radical as an oxygen containing acid as, for example, barium chromate. These compounds may all be classified under the term basic compounds of alkali forming metals.

The processes of this invention are applicable to such members of the class of hydroxy, ketonic and aldehydic carboxylic compounds and dicarboxylic compounds as have suitable structures for the formation of cylic ethers. In general, the process is applicable to such organic compounds as are theoretically capable of being reduced to gamma or delta dihydroxy compounds. Included in this classification are gamma and delta ketonic acids, esters, and anhydrides; gamma and delta aldehydic acids, esters, and anhydrides; gamma and delta hydroxy acids, esters, and anhydrides; 1,2 or 1,3 dibasic or polybasic acids, esters, and anhydrides. The scope of the processes of this invention may be represented by the following diagram in which type formulae are shown:

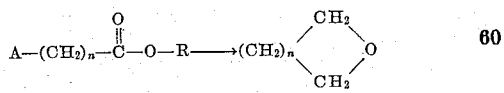

wherein $n$ may be 2 or 3, R may be hydrogen or a hydrocarbon radical, and A is a radical selected from the class of acyl, carboxyl, aldehyde, and hydroxymethylene groups. The carboxylic compound to be hydrogenated may be the free acid or a neutral derivative of the acid such as the ester or anhydride. In the case of a hydroxy acid derivative, the same results are obtained when the hyroxyl group exists as such or in combination as the ester with the same or another acid. Thus it follows that gamma and delta lactones are converted into the corresponding cyclic ethers on hydrogenation according to the processes of this invention.

The invention is generally applicable to compounds containing a carboxyl group or esters or anhydride thereof, a carbinol, keto or aldehyde group, gamma or delta to a carboxyl group such as open chain dibasic acids and their derivatives, such as succinic, glutaric, maleic, fumaric, malic, tartaric and citric acids and their simple esters; to certain cyclic dibasic acids such as hexahydro-o-phthalic acid and camphoric acid and their esters; to the anhydrides of such members of the above mentioned groups as are capable of the formation of anhydrides; and to the inner esters or lactones formed by partial reduction of the anhydrides, as for example, such lactones as hexahydrophthalide, succinide and the lactones of open chain hydroxy acids such as valerolactone. The invention is thus also generally applicable to hydroxy, aldehydic and ketonic compounds such as levulinic acid, gamma hydroxybutyric acid, pentanal 5-acid 1, omega hydroxyvaleric acid and the esters of these acids.

The above description and examples are to be taken as illustrative only and not as limiting the scope of the invention. Any modifications or variations therefrom which conform to the spirit of the invention are intended to be included within the scope of the claims.

I claim:

1. Process for the preparation of tetrahydrofurane, which comprises bringing an alkyl succinate into contact with hydrogen under a pressure of 200 atmospheres, and at a temperature of approximately 250° C., in the presence of a copper chromite catalyst.

2. Process for the preparation of a tetrahydrofurane compound which comprises bringing an ester of succinic acid, together with an excess of hydrogen, into contact with a hydrogenation catalyst at a temperature of 240°–400° C. and at a pressure substantially in excess of 10 atmospheres.

3. Process for the preparation of a tetrahydrofurane compound which comprises bringing succinic acid, together with an excess of hydrogen, into contact with a hydrogenation catalyst at a temperature of 240°–400° C. and at a pressure substantially in excess of 10 atmospheres.

4. Process for the preparation of a tetrahydrofurane compound which comprises bringing the anhydride of succinic acid, together with an excess of hydrogen, into contact with a hydrogenation catalyst at a temperature of 240°–400° C. and at a pressure substantially in excess of 10 atmospheres.

5. Process for the preparation of a tetrahydrofurane compound which comprises bringing an ester of succinic acid, together with an excess of hydrogen, into contact with a copper-containing hydrogenating catalyst at a temperature of 240°–400° C. and at a pressure substantially in excess of 10 atmospheres.

6. Process for the preparation of a tetrahydrofurane compound which comprises bringing succinic acid, together with an excess of hydrogen, into contact with a copper-containing hydrogenating catalyst at a temperature of 240°–400° C. and at a pressure substantially in excess of 10 atmospheres.

7. Process for the preparation of a tetrahydrofurane compound which comprises bringing the anhydride of succinic acid, together with an excess of hydrogen, into contact with a copper-containing hydrogenating catalyst at a temperature of 240°–400° C. and at a pressure substantially in excess of 10 atmospheres.

8. Process for the preparation of cyclic ethers, which comprises reacting with hydrogen a compound of the general formula

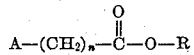

where $n$ is 2 or 3, R is a member selected from the group consisting of hydrogen and a hydrocarbon radical, and A is a member selected from the group consisting of acyl, aldehyde, hydroxymethylene, carboxyl, carboxylic ester and carboxylic anhydride groupings, said compound being further characterized in that where A is a group containing a carbonyl carbon, said carbonyl carbon is directly attached to the $(CH_2)_n$ group, at a temperature of 240°–400° C., and a pressure in excess of 10 atmospheres in the presence of a hydrogenating catalyst.

9. Process for the preparation of cyclic ethers, which comprises reacting with hydrogen a compound of the general formula

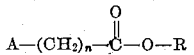

where $n$ is 2 or 3, R is a member selected from the group consisting of hydrogen and a hydrocarbon radical, and A is a member selected from the group consisting of acyl, aldehyde, hydroxymethylene, carboxyl, carboxylic ester and carboxylic anhydride groupings, said compound being further characterized in that where A is a group containing a carbonyl carbon, said carbonyl carbon is directly attached to the $(CH_2)_n$ group, at a temperature of 240°–400° C., and a pressure of 30–60 atmospheres in the presence of a hydrogenating catalyst.

10. Process for the preparation of cyclic ethers, which comprises reacting with hydrogen a compound of the general formula

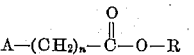

where $n$ is 2 or 3, R is a member selected from the group consisting of hydrogen and a hydrocarbon radical, and A is a member selected from the group consisting of acyl, aldehyde, hydroxymethylene, carboxyl, carboxylic ester and carboxylic anhydride groupings, said compound being further characterized in that where A is a group containing a carbonyl carbon, said carbonyl carbon is directly attached to the $(CH_2)_n$ group, at a temperature of 240°–400° C., and a pressure in excess of 10 atmospheres in the presence of a hydrogenating catalyst, comprising essentially a hydrogenating metal intimately associated with an acidic metal oxide.

11. Process for the preparation of cyclic ethers, which comprises reacting with hydrogen a compound of the general formula

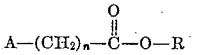

where $n$ is 2 or 3, R is a member selected from the group consisting of hydrogen and a hydrocarbon radical, and A is a member selected from the group consisting of acyl, aldehyde, hydroxymethylene, carboxyl, carboxylic ester and carboxylic anhydride groupings, said compound being further characterized in that where A is a group containing a carbonyl carbon, said carbonyl carbon is directly attached to the $(CH_2)_n$ group, at a temperature of 240°–400° C., and a pressure of 30–60 atmospheres in the presence of a hydrogenating catalyst, comprising essentially a hydrogenating metal intimately associated with an acidic metal oxide.

12. Process for the preparation of cyclic ethers, which comprises reacting with hydrogen a compound of the general formula

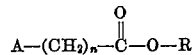

where $n$ is 2 or 3, R is a member selected from the group consisting of hydrogen and a hydrocarbon radical, and A is a member selected from the group consisting of acyl, aldehyde, hydroxymethylene, carboxyl, carboxylic ester and carboxylic anhydride groupings, said compound being further characterized in that where A is a group containing a carbonyl carbon, said carbonyl carbon is directly attached to the $(CH_2)_n$ group, at a temperature of 240°–400° C., and a pressure in excess of 10 atmospheres in the presence of a hydrogenating metal catalyst, comprising essentially a hydrogenating metal intimately associated with chromium oxide.

13. Process for the preparation of cyclic ethers, which comprises reacting with hydrogen a compound of the general formula

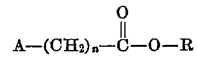

where $n$ is 2 or 3, R is a member selected from the group consisting of hydrogen and a hydrocarbon radical, and A is a member selected from the group consisting of acyl, aldehyde, hydroxymethylene, carboxyl, carboxylic ester and carboxylic anhydride groupings, said compound being further characterized in that where A is a group containing a carbonyl carbon, said carbonyl carbon is directly attached to the $(CH_2)_n$ group, at a temperature of 240°–400° C., and a pressure of 30–60 atmospheres in the presence of a hydrogenating metal catalyst, comprising essentially a hydrogenating metal intimately associated with chromium oxide.

14. Process for the preparation of cyclic ethers, which comprises reacting with hydrogen a compound of the general formula

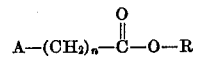

where $n$ is 2 or 3, R is a member selected from the group consisting of hydrogen and a hydrocarbon radical, and A is a member selected from the group consisting of acyl, aldehyde, hydroxymethylene, carboxyl, carboxylic ester and carboxylic anhydride groupings, said compound being further characterized in that where A is a group containing a carbonyl carbon, said carbonyl carbon is directly attached to the $(CH_2)_n$ group, at a temperature of 200°–500° C., and a pressure of 30–650 atmospheres in the presence of a catalyst comprising essentially copper chromite.

WILBUR ARTHUR LAZIER.

Certificate of Correction

Patent No. 2,130,501. September 20, 1938.

WILBUR ARTHUR LAZIER

It is hereby certified that errors appear in the printed specification of the above numbered patent requiring correction as follows: Page 3, second column, lines 59 to 63 inclusive, strike out the formula and insert instead the following—

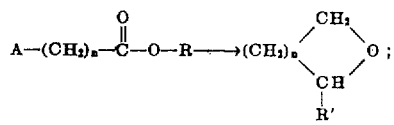

line 64, for "R" read *R and R'*; line 66, after the word "class" insert *consisting of*, and same line cancel "and"; line 67, strike out "groups" and insert instead the comma and words , *carboxylic ester, and carboxylic anhydride groupings;* and that the said Letters Patent should be read with these corrections therein that the same may conform to the record of the case in the Patent Office.

Signed and sealed this 25th day of October, A. D. 1938.

[SEAL] Henry Van Arsdale

*Acting Commissioner of Patents.*